United States Patent
Spohr et al.

(10) Patent No.: US 7,001,501 B2
(45) Date of Patent: Feb. 21, 2006

(54) METHOD FOR ETCHING AT LEAST ONE ION TRACK TO A PORE IN A MEMBRANE AND ELECTROLYTE CELL FOR PREPARING THE MEMBRANE

(75) Inventors: Reimar Spohr, Darmstadt (GB); Yu Pavel Apel, Dubna (RU); Yuri Korchev, London (GB); Zuzanna Siwy, Piekary Slaskie (PL); Masaru Yoshida, Gunma (JP)

(73) Assignee: Gesellschaft für Schwerionenforschung mbH, Darmstadt (DE)

( * ) Notice: Subject to any disclaimer, the term of this patent is extended or adjusted under 35 U.S.C. 154(b) by 215 days.

(21) Appl. No.: 10/961,499

(22) Filed: Mar. 6, 2003

(65) Prior Publication Data

US 2005/0072689 A1     Apr. 7, 2005

Related U.S. Application Data

(63) Continuation-in-part of application No. PCT/EP01/09911, filed on Aug. 29, 2001.

(30) Foreign Application Priority Data

Sep. 8, 2000  (DE) ................................ 100 44 565

(51) Int. Cl.
*C25F 3/12* (2006.01)
(52) U.S. Cl. ...................... 205/640; 205/655; 205/665; 204/252
(58) Field of Classification Search ................ 205/640, 205/655, 665
See application file for complete search history.

(56) References Cited

U.S. PATENT DOCUMENTS

| | | | |
|---|---|---|---|
| 3,770,532 A | * | 11/1973 | Bean et al. .................... 216/58 |
| 5,139,624 A | | 8/1992 | Searson et al. ............. 205/656 |
| 5,985,164 A | | 11/1999 | Chu et al. ....................... 216/41 |
| 6,706,532 B1 | * | 3/2004 | Vadgama et al. ............ 436/149 |

OTHER PUBLICATIONS

Apel et al., Diode-like single-ion track membrane prepared by electro-stopping, 2001, Nuclear Instruments and Methods in Physics Research B, 184, 337-346.*

* cited by examiner

Primary Examiner—Roy King
Assistant Examiner—Michael P. Alexander
(74) Attorney, Agent, or Firm—Klaus J. Bach (57) ABSTRACT

In an electrolytic cell a membrane consisting of dielectric material such as an organic polymer, which separates two chambers of the electrolytic cell from each other is produced using an etching solution which is provided in one of the chambers, contains active etching ions, while the other chamber contains a solution, which does not have an etching action. An electrical field is generated through the membrane. The etching progresses along ion tracks in the membrane and first produces one funnel-shaped pore per ion track. Immediately prior to the breakthrough, the ions, which do not have an etching action, begin to penetrate the still existent thin layer with fine pores—the active layer—and displace the ions with an etching action. An intensified electric current, driven by the adjacent field, is established and the etching process at the bottom of the pore shifts sideways according to the concentration of etching ions still present. The process is stopped by deactivating the field and flushing the membrane.

5 Claims, 6 Drawing Sheets principle of self-limited electro-stopping process

Principle of nano-pore operation opened by electric field closed by electric field closed by protonization

Fig. 5

METHOD FOR ETCHING AT LEAST ONE ION TRACK TO A PORE IN A MEMBRANE AND ELECTROLYTE CELL FOR PREPARING THE MEMBRANE

This is a Continuation-In-Part application of international application PCT/EP01/09911 filed Aug. 29, 2001 and claiming the priority of German application 100 44 565.9 filed Sep. 8, 2000.

BACKGROUND OF THE INVENTION

The invention relates to a method for etching at least one ion track so as to form a pore in a membrane and an electrolyte cell for preparing such a membrane from a foil for use as a separation membrane or as a membrane in a measuring or control system or in a sensor.

Membrane technology is a rapidly growing field with applications of large economical and ecological consequences and importance. Homogenous, responsive membrane systems which can control the flow of substances are quite advanced and are already widely utilized. Heterogeneous composite membranes, which are based on hydro-gels and are manufactured mechanically on strong substrates, are already known in the art.

An electrolytic cell with two electrolytes to be separated by a membrane can be operated as an electrically controlled valve. It can further be stimulated in its behavior thermically and/or by the pH value and/or the pH value gradient and/or by chemical compounds to be detected in the electrolytes (sensor function). It can also be used for transferring certain substances from one cell half through the membrane to the other cell half in a controlled manner. (actor function, chemical valve). With its pore area the membrane separates in the electrolyte cell a first electrolyte, the "inner phase"—in medication dosing apparatus this is the medication reservoir—from the second electrolyte, the "outer phase"—in medication dosing apparatus, this is the body liquid—without any further action.

If the membrane in its matrix consists of an organic polymer then the absorption of water is based on the presence of polar groups in the network of the polymer. The degree of swelling depends on the temperature, the pH value and the concentration of dissolved substances. So-called hydro-gels can swell by more than 100%. Their swelling properties can be imprinted for a specific stimulation by an addition or copolymerization of specific chemical groups. The switching time of these so-called thermo-responsive membranes is in a minute range.

The permeation of dissolved substances increases with the degree of swelling of the membrane and is determined by pressure gradients and the concentration. For swelling, water must enter the polymer matrix. The time required for the water to enter increases exponentially with the thickness of the hydrogel. The volume flows of the substances to be transported rapidly decrease with increasing thickness of the hydro-gel. It is therefore important that the membrane to be penetrated is as thin as possible. The physico-chemical stopping is one known technique to manufacture ultra-filtration and reverse osmosis membranes with a very thin active layer of a few nm thickness. These filters are already widely used in connection with rigid-pore filters with ultra-fine pores. The stimulus-responsive ion-track membrane permits the manufacture of a hydro-gel layer with a thickness of several micrometers. The switching is therefore quite slow, that is, it has a time constant in the area of minutes. The thermo-responsive chemical valve provides for an electrical switching of the permeability by the application of an electrical current selectively, that is, only the pores, not the whole membrane are heated and the switching can therefore be controlled rapidly. However, the active layer of the membrane is in the thickness range of the membrane (1 to 100 micrometer).

The main problems of the state of the art are that the membranes described have too long a response time or too low a permeability corresponding to the thickness of the active layer.

It is therefore the object of the present invention to provide a membrane system which provides for an extremely fast release of chemical substances that is within milliseconds to fractions of a second, has an inherent sensor capability, and provides for an electric control of the transferred substance.

SUMMARY OF THE INVENTION

A membrane consisting of dielectric material such as an organic polymer, separates two chambers of an electrolytic cell from each other. The membrane is produced using an etching solution, which is provided in one of the chambers, said etching solution contains active etching ions, which etch the organic polymer. The other chamber contains a solution, which does not have an etching action. An electrical field is generated through the membrane with an electrode that is dipped into the respective electrolytes and a voltage source connecting the two electrodes. The etching process makes its way along the ion tracks on one side, through the membrane and first produces one funnel-shaped pore per ion track. Immediately prior to the breakthrough, the ions, which do not have an etching action, begin to penetrate the still existent thin layer with fine pores—the active layer—and to displace the ions with an etching action at the exit point. An intensified electric current, driven by the adjacent field, is established. The etching process on the floor of the pore shifts sideways according to the concentration of etching ions still present. The process can be stopped by deactivating the field and washing the membrane. A membrane produced in this way can be operated as an electrochemical valve and can be used with one or more pores as a sensor or with many pores to control concentration.

With the method according to the invention, the thickness of the active layer the membrane is reduced by at least an order of magnitude. To this end, the etching of the ion-exposed membrane is performed one-sided, that is, starting from one side of the membrane, with a stop-bath being disposed at the other side of the membrane.

During the etching out of the ion track, an electrical field is established between the two sides of the membrane. When the pores break through the membrane the electrical field initiates a self-limiting stop process, wherein the active ions—which are responsible for the etching—are pulled back from the etching front. In this way, a very thin active layer is formed at the side of the stop bath. The process results in the formation of a membrane of high tearing strength, which is responsive, asymmetric and nano-porous and has a very thin active layer adjacent the stop bath. The thickness is between fractions of micrometers, $\mu$m, and several nanometers, nm.

Depending on the ion irradiation, the membrane may have one or several pores. The number of pores depends on the intended application:

Single ion membranes can be used as chemical sensors such as pH sensors or substrate-specific sensors, glucose-sensors, etc.

Membranes with a few pores—two to several millions per $cm^2$—provide for increased sensitivity and may permit fluctuations and synchronization processes.

Multi-pore membranes—several thousand to several billions per $cm^2$—permit a rapid release of chemical substances for use in bio-technical and medical application.

The membrane has an inherent sensor property; on the other and, the transfer of substances through the membrane can be electrically controlled. As a result of the manufacture, the current-voltage characteristic is asymmetric. That means that also the substance transport depends on the direction of the electrical field applied. The asymmetry can be further increased by a pH gradient applied at the same time.

The permeability of the active layer depends on:
the orientation of the electrically charged groups at the pore wall, and
the concentration of hydrogen ions—protonization—within the pore.

The permeability can therefore be controlled by the pH value, or respectively, by an electrically controlled proton transport into the active layer or out of the active layer.

Accordingly, switching is achieved by:
the application of an electric field in that it attracts or repulses the electrically charged groups in accordance with the field direction (electrically responsive), or
the proton transport out of the adjoining medium with the low pH valve into the active layer or, respectively, out of the active layer (pH responsive).

With the electric initiation and the very small thickness of the active layer, it is possible to open and close the membrane within fractions of a second. As a result, the membrane is suitable for fast sensors, fast, controlled bio-reactors and fast medication dosing systems.

The proposed solution permits a rapid control in the time constants in the magnitude of milliseconds to fractions of a second.

A monolithic membrane comprises at least one pressure-resistant nano-porous active layer which is anchored in the surrounding matrix and which consists of the original matrix material.

As sensor, the electric current flowing through the active layer depends on the chemical or the pH value stimulations, which come from the neighboring medium. The sensor capability is the result of the relatively thin active layer, which is better than with the above-mentioned electrically switched thermo-responsive membrane.

The electrically switched membrane has a high on/off switching ratio, that is, a high ratio of the volume flows in the switched-on and the switched-off state, which, because of the smaller electric currents required for the switching, is more sensitive than with the above-mentioned electrically switched thermo-responsive membrane.

The active layer of the membrane can be modified by added chemical groups or immobilized enzymes and is then suitable for example as glucose-specific sensor.

Below a method and an electrolytic cell design with a matrix of poly-ethylene-terephtalate, PET, disposed between the two cell halves are described on the basis of the accompanying drawings.

DESCRIPTION OF PREFERRED EMBODIMENTS

Asymmetric single-track membranes are manufactured of PET by etching from one side with caustic soda (NaOH) whereas the other side is at the same time exposed to a neutral potassium chloride solution, KCl. The direction of the applied electrical field through the membrane during etching has a strong influence on the function of the membrane manufactured in this way. The etching is stopped at a predetermined current by replacing the etching solution with an acid or neutral potassiumchloride solution. After the etching the membrane is immersed into a KCl solution with a known pH value and the current-voltage characteristic of the single pore membrane is measured. The current through the membrane over time during etching depends strongly on the polarity of the voltage applied. When the OH ions are withdrawn from the reaction zone, a strongly non-linear current-voltage characteristic of the finished membrane is obtained comparable to that of an electronic diode. Electric travel exceeds the travel by diffusion already at a voltage of over 0.1 Volt. The diode behavior depends on the pH value. This can be utilized as sensor or valve properties. When the polarity is reversed during the break-through in that the OH ions are pushed into the reaction zone, substantially larger pores are formed and the degree of controllability of the pores is smaller.

Figure 3:
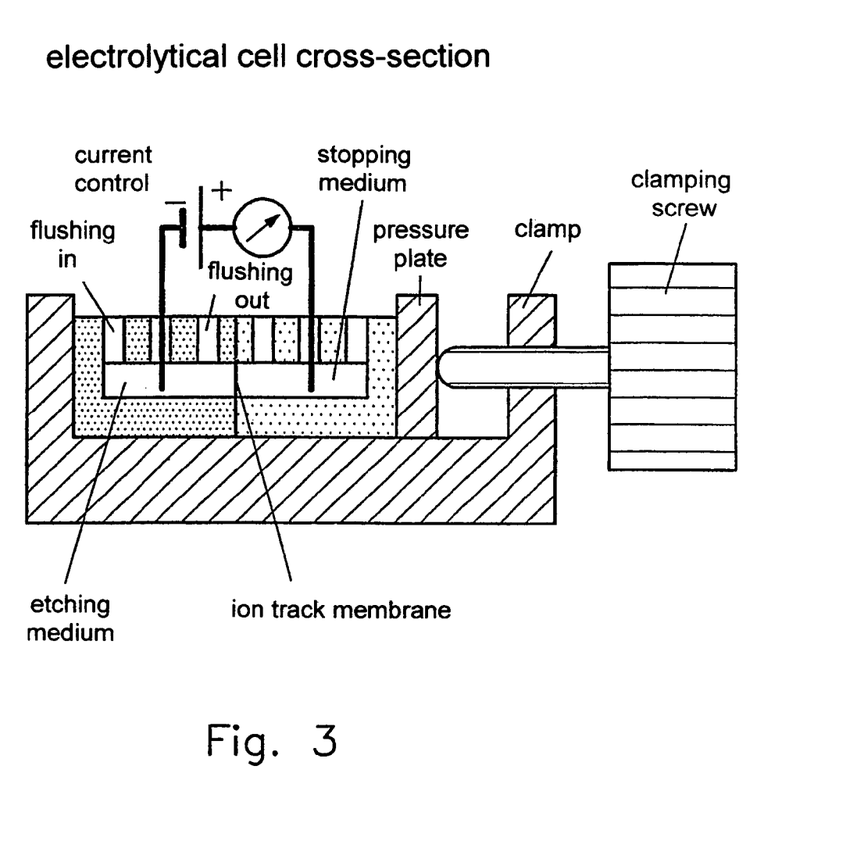
FIG. 3 shows an electrolytic cell in cross-section.

The Manufacture of an Electrically Switched Single Pore Membrane:

A circular disc irradiated first in its center with a single gold ion of a specific energy of 10.6 MeV/nucleon and 12 $\mu$m thickness and a diameter of 30 mm consisting of PET is etched at one side in 9 M NaOH-solution at 220° C. To this end, the membrane is inserted into the electrolytic cell (FIG. 3), which consists of two cell halves of caustic-soda-resistant Kel-F (tradename=Polychlorotrifluoroethylene, $CClF_3$) and which is hermetically closed by a clamping structure. In this way, the membrane can be easily installed and removed. The membrane disposed between the two flat-faced polymer blocks separates two chambers formed in the two cell halves. The compression enclosure of the membrane is such that leakage currents along the outer membrane surface during etching are prevented. To this end, the electrolytic cell is disposed on the bottom of the U-shaped base and is biased, with the jaw at the one front side, with the other front side against one leg of the U-shaped base. The engagement pressure is adjusted by an axially movable threaded spindle supported by the other leg of the U-shaped base.

During etching (see FIGS. 1 and 2), a gold electrode extends into each cell half and a silver/silver chloride electrode extends into each cell half during measuring for measuring the electric current-voltage characteristics (FIG. 4a): One of the cell halves contains the etching medium, the other the stop medium.

Figure 2:
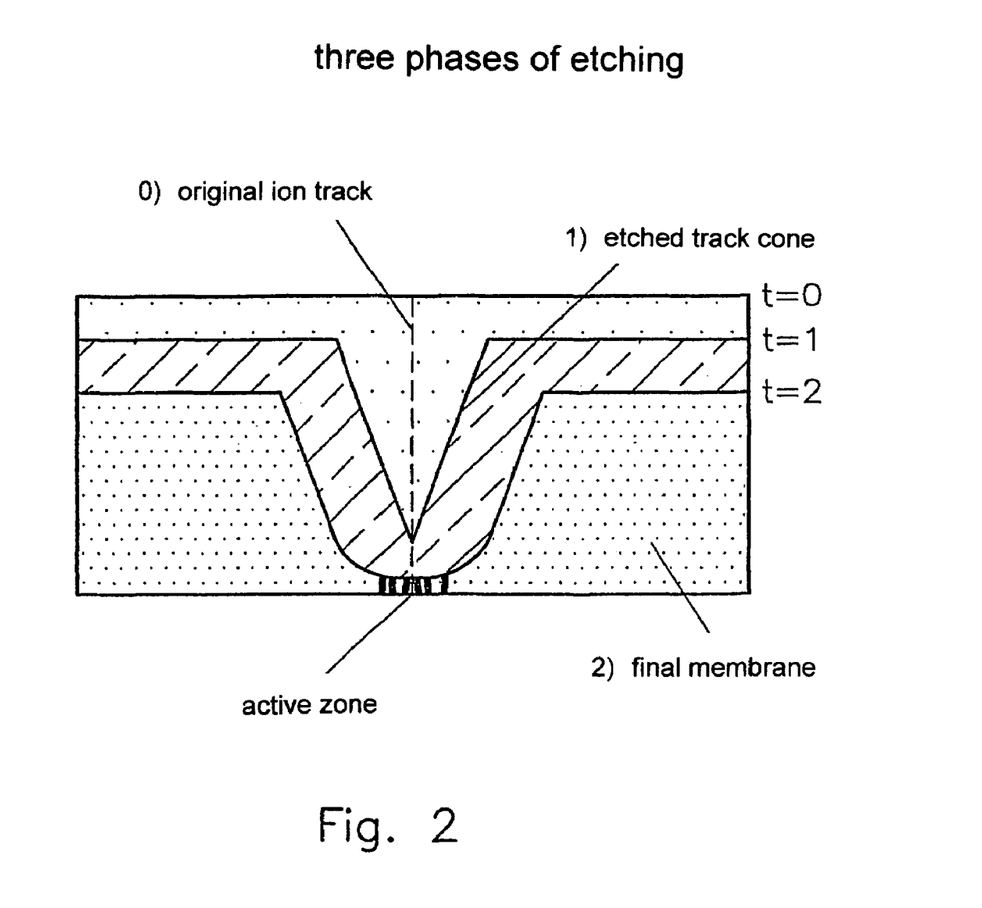
FIG. 2 shows the three characteristic etching phases.

FIG. 2 shows three characteristic phases of the etching procedure in the manufacture of the active layer of the membrane. To this end, an electric potential difference of 0.1 to 1 V across the membrane is established. The stop medium is an aqueous 1 M KCl-solution. At the time, t=0 in FIG. 2, the etching process starts over the full accessible membrane surface area at the etching solution side thereof by the etching ions in the etching solution. At the time t=1 ZE (time unit), a cone-shaped etched-out area is already present in the matrix which advances along the ion track. As soon as an electric current begins to flow upon further etching, the process of the electrical stopping is initiated. At the time, t=2 ZE, a nano-porous active layer has been formed which then grows toward the side.

The electric current flowing through the membrane is monitored during the etching. When a predetermined value is exceeded, the etching process is interrupted by flushing a predetermined volume of the etching medium out of the etching chamber and replacing it with the same volume of the stop medium. This process leads to a mechanically stable micro-porous membrane, which contains at the foot of the pore toward the stop bath a small area of the very thin, nano-porous layer which is the actually effective membrane (see FIG. 2).

During the last phase of the etching, immediately before the breakthrough occurs, the direction of the applied electrical field is particular important. When the electrical field pulls the etch-active ions back from the etching front, they are replaced by non-active ions of the same polarity from the other side of the etching front. This process weakens and slows down the etching process at the foot of the pore, which is the etched-in ion track and results there in the formation of the thin active layer with micro-pores or micro-channels, which is firmly anchored in the surrounding matrix (FIG. 2).

Figure 1:
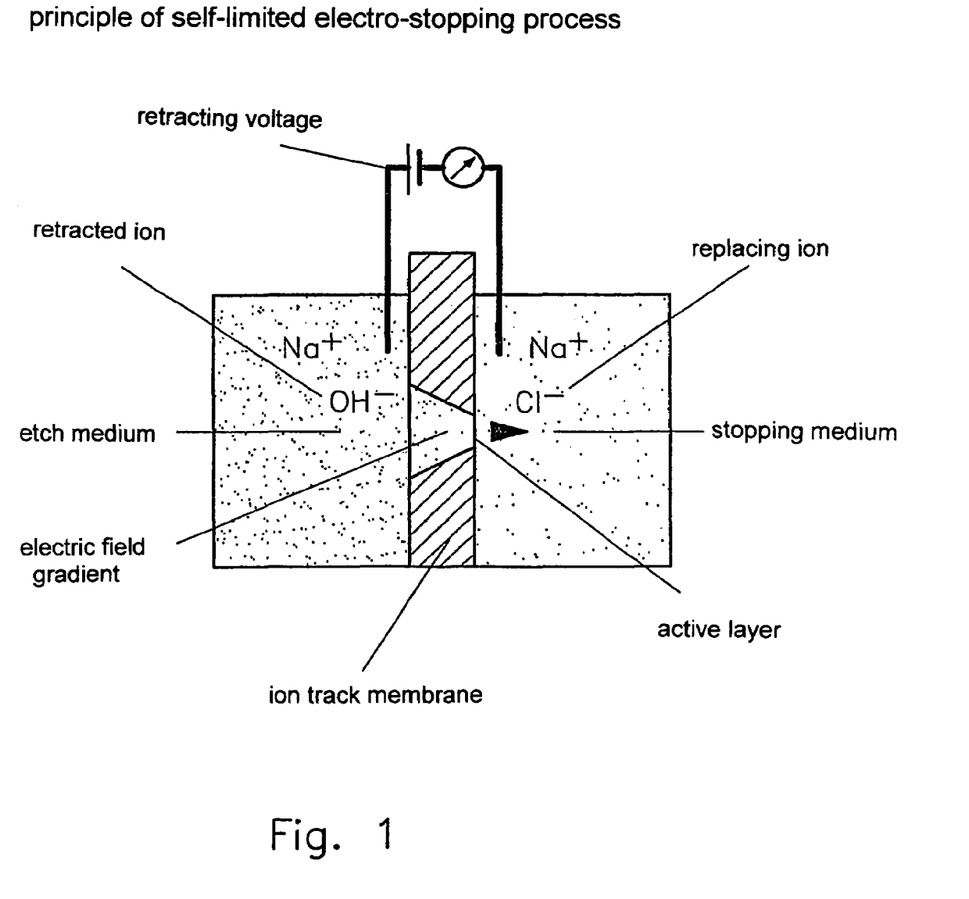
FIG. 1 shows the principle of the self-limiting electro-stop process.

Here, the etching is performed with an aqueous NaOH-solution. The active ions are the OH ions; they are replaced by inactive $Cl^-$ ions from the stop side of the membrane (FIG. 1). $Na^+$ ions are used as exchange ions. The principle of the electrical stopping can be utilized with any combination of electrolyte etching and stopping solutions. The field-stopped generation of the nano-porous active layer is in this connection always the deciding part.

The method is based on the following assumption: Upon pore-breakthrough which is indicated by a steep increase of the electric current through the membrane, the etching medium at the end of the pores, including all molecule pieces dissolved therein, is suddenly diluted by the stopping medium. At the same time at the pore ends, the etch-active ions are replaced proportionally to the electrical current density. As a result, the bottom of the pore is rounded and a thin porous layer, that is, the actual membrane, which because of its small diameter is highly pressure resistant, remains.

An important feature for the accurate definition of the permeability of the nano-porous active layer is the flushing process, which is initiated as soon as the predetermined current is reached. This permits the manufacture of membranes with a well-defined pore size. The diameter of the nano-pores is determined by the use of polyethylene glycols of several molecular weights, that is, molecules thereof which form approximately a sphere of known diameter. The pore width in the described example is about 2.5 nm.

Figure 5:
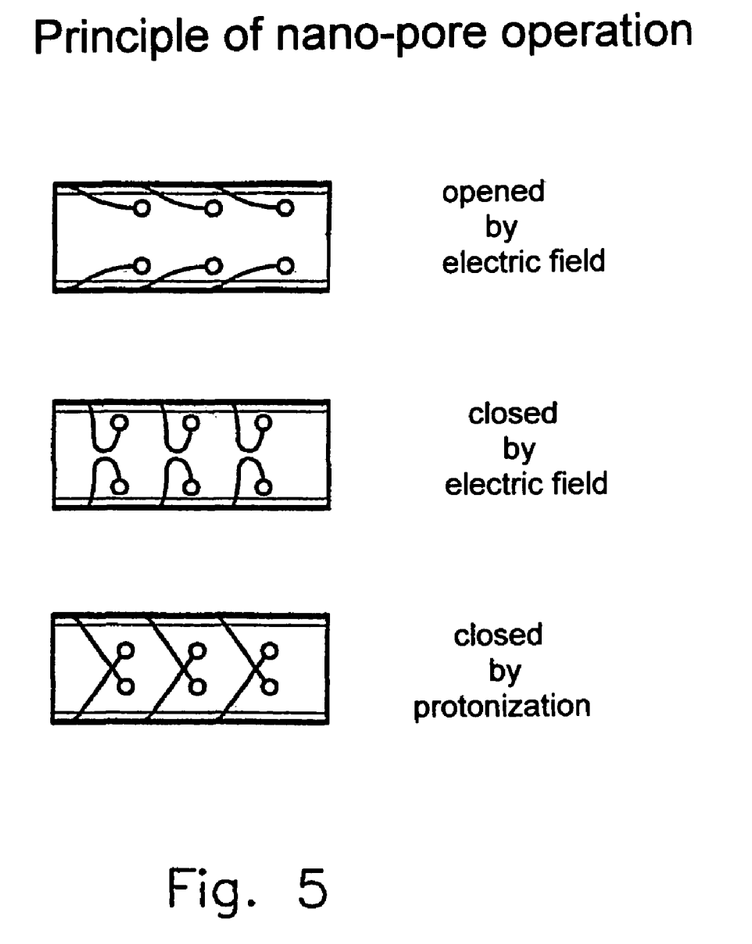
FIG. 5 shows a model of the nano-pore operation.

The active layer of the membrane is composed of nano-pores as already pointed out. In accordance with the osmotic pressure shock occuring at the end of the pores during the break-through by the abrupt dilution of the etching medium, including all the molecule pieces dissolved therein, there is an inherent membrane asymmetry which may be described as a staggered array structure as shown in FIG. 5 in three phases (a, b, c). The charges bound to the wall, shown in the figure as circles connected to the walls by filaments, with a high pH value, are stretched by the electrical field and, in this way, open the pore (see FIG. 5a). The depending charge groups are supported on their strings so as to be movable preferably in one direction. Reversal of the electrical field curves or bends the polymer filaments which, in this way, close the pore (see FIG. 5b). Closure of the pore is achieved by protonization under asymmetric pH conditions by the pulling in of protons from the low-pH-bath in the active zone of the membrane. This results in an overlapping of the charged groups whereby the pore is closed (FIG. 5c).

Figure 4A:
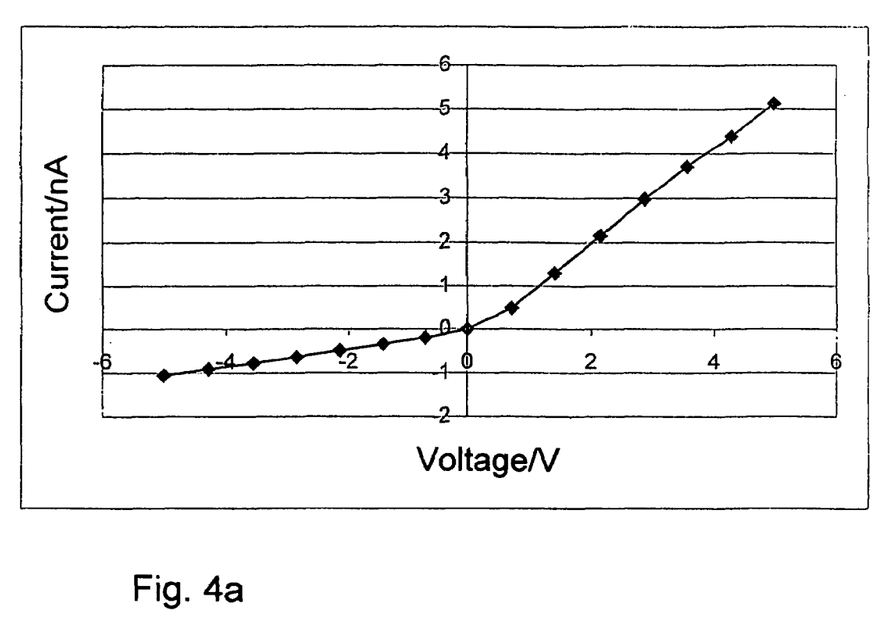
FIG. 4a shows the current-voltage characteristic.

FIG. 4a shows the current voltage characteristic of an electrically asymmetric switchable membrane in an environment which is symmetric with respect to the pH value, that is, in both chambers/cell halves, there is the same pH value of, in this case, pH 8. The electric current depends on the polarity of the applied voltage. For same value voltages, different electrical currents are obtained at different polarities. This means, on one hand, that the pore transmits the current preferably in one direction, but, on the other hand, the effective cross-section of the pore depends on the direction of the electrical field applied. This corresponds to an opening and closing of a valve. This representation shows and confirms the understanding as presented in connection with FIG. 5, that is, that the membrane has an inherent asymmetry.

If, in addition to the typical asymmetry, a pH gradient is provided that is, in this case, a pH value of 3 is provided at one side and a pH value of 9 is provided at the other side of the membrane, the asymmetry is even more evident.

Figure 4B:
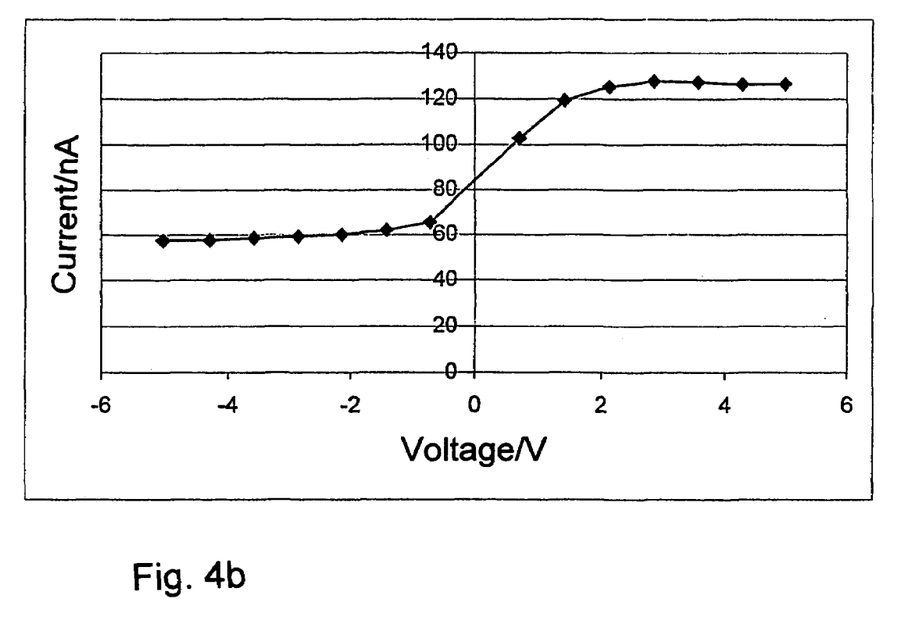
FIG. 4b shows the equivalent pore diameter.

Similar to the current voltage characteristic curve as shown in FIG. 4a, FIG. 4b shows the equivalent diameter curve for a cylindrical pore determined therewith and calculated on the basis of the measured guide value of the electrolyte and the measured thickness of the membrane. Below −1 V the pore diameter is constant. Above −1 V the pore opens gradually—almost linearly, up to about 1.5 V and then maintains its fully open diameter with further increasing voltage. The equivalent pore cross-section, and consequently, the electrical resistance of the pore changes by more than 4 times with full electrical voltage applied.

The electrically switchable membrane can be installed in a conductive cell, which is filled with an aqueous solution. The effective diameter of the pores is controlled by the electrical field applied to the membranes or by chemical irritation. Depending on the charge state of the hydro-gel in the active membrane layer, the membrane swells or it shrinks. This permits a control of the volume flow of dissolved compounds through the membrane.

The characteristic properties of the membrane are:
the use of at least one etched ion track;
the manufacture of micro-channels with a diameter of 10 to 0.01 micron:
the asymmetry of the whole pore shape corresponding to the progress of the one-sided etching;
at least one nano-porous active layer because of the self-limiting electro-stopping of the etching process;
the thickness of the active layer is a fraction of a $\mu m$ down to several nm;
the micro-channel length is between 1 and 500 microns.

An electrolytic cell provided with such a membrane may be used as a bio-sensor or a medication dosing system.

What is claimed is:

1. A method of etching at least one ion track in a membrane so as to form a pore, said membrane consisting of a matrix material dielectricum, which can be etched in a preferential manner along an ion track and being disposed in an electrolytic cell with two chambers which are separated from each other by the membrane, said method comprising the steps of:

supplying to one chamber of said electrolytic cell an etching solution which contains ions which are etch-active with respect to the matrix material of the membrane, supplying to the other chamber of said electrolytic cell a stop solution which contains ions of the same polarity as the etch-active ions but which are inactive with respect to the matrix material of the membrane, providing a first electrode extending into the etching solution and a second electrode extending into the stop solution and establishing a voltage difference between the first and second electrodes by which an electrical field across the membrane is generated whose strength is time-dependent controllable and whose direction is adjustable, monitoring the electric current flowing through the membrane during the etching procedure, while an etching front forming etching pores travels from the side of the etching solution along the ion track through the membrane toward the side of the stop solution, when, upon reaching the stop solution side of the membrane, current begins to flow through the etching pores from the etching solution side to the stop solution side, etch-active ions are replaced by etch inactive ions of the same polarity from the stop solution causing the etching procedure to continue at a slowed rate corresponding to the dilution of the etching solution while a thin active membrane layer remains at the bottom of the etching pores which slowly grows sidewardly from the bottom of the etching cavities where the concentration of inactive ions remains lower, and, during the last phase of the etching procedure shortly before the penetration of the etching front when the electric current flow through the etching groove rapidly increases and the electric field and the field direction become the determining factor for the progress of etching, the etch active ions are retracted from the etching front and replacing them by inactive ions of the same polarity from the stop solution side thereby forming at the bottom of the etching pores thin nano-porous layers which form the active membrane layer, and flushing the etching solution from the one chamber containing the etching solution and replacing it by a neutral solution.

2. A method of etching according to claim 1, wherein said electrolytic cell is used as a switching cell and a chemical substance is added to one of the two cell chambers which enhances the switching functions of the cell.

3. A method of etching according to claim 2, wherein the switching of the cell is initiated by adjustment of the pH value in one of the two cell halves, which is different from that in the other—pH-stimulation.

4. A method of etching according to claim 2, wherein the switching of the cell is initiated by adjustment of an electric current conducted through the cell—electrical stimulation.

5. A method of etching according to claim 2, wherein the switching of the cell is initiated by changing the temperature of the cell overall or locally in a particular pore electrothermal stimulation.

* * * * *